(12) United States Patent
Menzel

(10) Patent No.: US 8,591,846 B2
(45) Date of Patent: Nov. 26, 2013

(54) METHOD AND DEVICE FOR PROCESSING SOUR GAS RICH IN CARBON DIOXIDE IN A CLAUS PROCESS

(75) Inventor: Johannes Menzel, Waltrop (DE)

(73) Assignee: Thyssenkrupp UHDE GmbH, Dortmund (DE)

( * ) Notice: Subject to any disclaimer, the term of this patent is extended or adjusted under 35 U.S.C. 154(b) by 0 days.

(21) Appl. No.: 13/638,449

(22) PCT Filed: Mar. 22, 2011

(86) PCT No.: PCT/EP2011/001398
§ 371 (c)(1),
(2), (4) Date: Sep. 28, 2012

(87) PCT Pub. No.: WO2011/124326
PCT Pub. Date: Oct. 13, 2011

(65) Prior Publication Data
US 2013/0017144 A1   Jan. 17, 2013

(30) Foreign Application Priority Data
Mar. 29, 2010  (DE) .......................... 10 2010 013 279

(51) Int. Cl.
| | | |
|---|---|---|
| B01D 53/52 | (2006.01) | |
| B01D 53/62 | (2006.01) | |
| B01D 53/74 | (2006.01) | |
| B01D 53/75 | (2006.01) | |
| B01J 7/00 | (2006.01) | |
| C01B 17/04 | (2006.01) | |

(52) U.S. Cl.
USPC ..... 423/220; 423/228; 423/242.1; 423/242.7; 423/573.1; 423/574.1; 422/168; 422/169; 422/170; 422/187; 96/234; 96/242; 96/243; 95/235; 95/236; 48/127.3; 48/127.5; 48/127.7; 48/127.9

(58) Field of Classification Search
USPC ............... 423/220, 228, 242.1, 242.7, 573.1, 423/574.1; 95/235, 236; 48/127.3, 127.5, 48/127.7, 127.9; 96/234, 242, 243; 422/168, 169, 170, 187
See application file for complete search history.

(56) References Cited

U.S. PATENT DOCUMENTS

| | | | | |
|---|---|---|---|---|
| 4,198,388 | A * | 4/1980 | Laslo et al. ................. | 423/574.1 |
| 4,483,833 | A * | 11/1984 | Stogryn et al. ................ | 423/228 |
| 4,498,911 | A * | 2/1985 | Deal et al. ...................... | 95/176 |
| 6,962,680 | B1 | 11/2005 | Ishigaki et al. | |
| 8,007,569 | B2 | 8/2011 | Saecker et al. | |
| 2013/0022534 | A1 * | 1/2013 | Menzel ...................... | 423/576.8 |

FOREIGN PATENT DOCUMENTS

| | | |
|---|---|---|
| DE | 10332427 | 2/2005 |
| EP | 1338557 | 8/2003 |
| JP | 10028837 | 2/1998 |

OTHER PUBLICATIONS

International Search Report for PCT/EP2011/001398, English translation attached to original, Both completed by the European Patent Office on Sep. 2, 2011, All together 6 Pages.

* cited by examiner

Primary Examiner — Timothy Vanoy
(74) Attorney, Agent, or Firm — Brooks Kushman P.C.

(57) ABSTRACT

A method and apparatus for processing a sour gas rich in carbon dioxide in a Claus process, so sulfur compounds are removed by a selective solvent in a gas scrubbing process. Sulfur components and carbon dioxide, are separated into at least two sour gas fractions, wherein at least one sour gas fraction having a higher content of sulfur components is obtained, wherein the fraction having the highest hydrogen sulfide content is introduced in the thermal reaction stage of the Claus furnace with a gas containing oxygen by means of a burner. The sulfur is converted to sulfur dioxide in the thermal reaction stage of the Claus furnace and exhaust gases are discharged into the closed Claus reaction chamber behind the burner. The remaining sour gas fractions stripped of sulfur components are fed to the Claus reaction chamber and are mixed with the combustion gases leaving the burner.

29 Claims, 3 Drawing Sheets

METHOD AND DEVICE FOR PROCESSING SOUR GAS RICH IN CARBON DIOXIDE IN A CLAUS PROCESS

CROSS-REFERENCE TO RELATED APPLICATION

This application is the U.S. national phase of PCT Appln. No. PCT/EP2011/001398 filed on Mar. 22, 2011, which claims priority to German Patent Application No. 10 2010 013 279.9 filed on Mar. 29, 2010

The invention relates to a method for processing a carbon dioxide-rich acid gas in a Claus process. The invention also relates to a contrivance which serves to carry out the method, the said contrivance comprising a combination of flash stage and regeneration column by means of which the absorbing agent used for gas scrubbing is freed from carbon dioxide-rich acid gas, and a Claus burner with downstream Claus reactor.

Many industrial gases, such as natural gas, synthesis gas, refinery gases or coke-oven gases, must be freed from acid gases contained therein prior to use because said substances disturb further processing. Typical acid gases, which disturb further processing and must therefore be separated from the gases to be obtained, are hydrogen sulphide ($H_2S$), carbonyl sulphide (COS), organic sulphur compounds, ammonia ($NH_3$) or hydrocyanic acid (HCN). These gases are of corrosive effect and are toxic. A way to remove these from the gases to be obtained is gas scrubbing using physically absorbing solvents. Suitable solvents absorbing acid gas are, for example, propylene carbonate, N-methylpyrrolidone, alkylated polyethylene glycol ether and methanol. Chemically absorbing solvents can also be used but their absorption capacity for organic sulphur compounds is only low. Examples of chemically absorbing solvents are ethanol amines or alkali salt solutions.

For recovery of the sulphur compounds contained in the acid gases the acid gases from the regeneration unit of the gas scrubbing process are normally fed to a Claus plant in which a part-stream of the separated hydrogen sulphide is burnt to give sulphur dioxide which is then converted with the residual stream of hydrogen sulphide to form sulphur according to the Claus reaction. The sulphur can be further used in most diverse ways.

Frequently, the industrial gases to be treated also contain larger portions of carbon dioxide ($CO_2$) in addition to sulphur constituents, such as hydrogen sulphide ($H_2S$), carbon oxide sulphide (COS) and mercaptans. Large portions of carbon dioxide are formed, for example, in synthesis gas processes in which the carbon monoxide formed in synthesis gas production is converted to form carbon dioxide by means of CO conversion such that these industrial gases often contain larger amounts of carbon dioxide. The portion of the carbon dioxide can accordingly be up to 50 percent by volume (vol.-%) in the converted synthesis gas. On the other hand, the portion of sulphur constituents in the converted synthesis gas can be very low depending on the feedstock for synthesis gas production, portions below 0.1 vol.-% being feasible.

In gas scrubbing, whether it be physical or chemical, it cannot be avoided that, apart from the sulphur constituents to be removed from the synthesis gas, also a significant portion of the carbon dioxide contained in the gas to be treated is removed from the feed gas by scrubbing such that major part of the acid gases re-liberated in the regeneration unit of the gas scrubbing section often consists of carbon dioxide. The latter has a disturbing effect in the further processing of the acid gas in a Claus plant because the combustible acid gases have only a low calorific value on account of the dilution with the inert carbon dioxide and, as a result of which, it is not or only hardly possible to achieve the high temperature of at least 850-900° C. required for a stable Claus furnace operation.

For this reason there are prior-art processes which facilitate a separation of the carbon dioxide from the sulphur-containing acid gases. DE 10332427 A1 teaches a method for the removal of hydrogen sulphide and other acid gas constituents from pressurised industrial gases using a physical scrubbing agent as well as the recovery of sulphur from hydrogen sulphide in a Claus plant. In the process, the industrial gases to be treated are freed from the acid gases contained therein by gas scrubbing using suitable absorbing solvents and the laden absorbing agent is passed to regeneration. The gas scrubbing section is of the multi-stage type, the various regeneration stages having different pressure levels and a lower pressure than the absorption step such that a sulphur constituents-enriched acid gas is obtained. The sulphur-containing acid gas stream obtained is fed to a Claus process, the tail gas of which is recycled after hydrogenation to, for example, the regeneration stages for complete desulphurisation.

Especially if an industrial gas of a high carbon dioxide content, e.g. 30-50 vol.-% $CO_2$, at a simultaneously low sulphur content, e.g. 0.1-1 vol.-% $H_2S$, is to be desulphurised, very high expenditure will be required in acid gas scrubbing to produce an acid gas which has a sufficiently high sulphur content for further processing in a Claus plant, as, in the case of selective scrubbing agents, the chemical or physical selectivity of such scrubbing agent normally fails to be sufficient to achieve a sulphur concentration in the acid gas fraction that is acceptably high for such cases.

It is therefore the objective to provide a cost-efficient process which removes sulphur constituents from a carbon dioxide-rich industrial gas and passes them to a Claus process in such a manner that these can still be processed in stable operation of the Claus plant.

The invention achieves this objective by a method which first subjects the industrial process gas to be treated to gas scrubbing using a physical or chemical solvent acting selectively on sulphur constituents, in particular hydrogen sulphide ($H_2S$), from which an acid gas fraction is obtained which is fed to a regeneration unit and which fractionates the acid gas liberated in the regeneration into at least one sulphur constituents-depleted acid gas fraction, the sulphur constituents-enriched acid gas fraction then being fed to the thermal reaction stage of the Claus process where the sulphur constituents-enriched acid gas fraction is burnt to give sulphur dioxide according to the requirements of the Claus process, and the carbon dioxide-rich, but sulphur constituents-depleted acid gas fraction from the regeneration unit being mixed to the hot combustion gases leaving the burner and the thermal reaction stage of the Claus process.

The separation into at least two acid gas fractions is preferably performed by first feeding the solvent laden with acid gases from the gas scrubbing section to a flash stage for the depletion of carbon dioxide prior to feeding the solvent to a regeneration column, thereby obtaining a carbon dioxide-rich acid gas fraction and a solvent laden with the residual acid gases, thereby obtaining another carbon dioxide-depleted and sulphur constituents-enriched acid gas fraction fed to the Claus burner for combustion using an oxygen-containing gas. The ratio of carbon dioxide-rich and low-sulphur acid gas fraction to high-sulphur acid gas can be determined by the operating parameters of the flash vessel. The ratio can be advantageously used to control the Claus process.

The first stage of a Claus reactor is typically designed without any further accompanying substances such that the reaction between sulphur dioxide ($SO_2$) and hydrogen sulphide ($H_2S$) is initiated by the high reaction temperature. This is also called thermal Claus reaction stage. Since this reaction is normally incomplete, the reaction is frequently completed in a downstream reaction stage at a lower temperature. Since for this a catalytic Claus reactor is required, this is also called catalytic Claus reaction stage.

The main claim especially relates to a method for the desulphurisation of hydrogen sulphide-containing and carbon dioxide-containing acid process gases, according to which (a) an industrial gas to be freed from sulphur constituents and containing at least hydrogen sulphide and carbon dioxide as acid gas constituents is first submitted to gas scrubbing using an acid gas-absorbing solvent which absorbs sulphur constituents more selectively than carbon dioxide, and (b) the laden solvent is fed to a regeneration unit for regeneration, and (c) the acid gas liberated in the regeneration and consisting of sulphur constituents and carbon dioxide ($CO_2$) is separated into at least two acid gas fractions, and at least one acid gas fraction of a higher content of sulphur constituents is obtained, and (d) the fraction of the highest content of hydrogen sulphide ($H_2S$) is fed to the Claus burner of a Claus reactor, the sulphur constituents contained being converted at least partially to a sulphur dioxide ($SO_2$)-containing gas by the aid of an oxygen-containing gas, and (e) the hot combustion gases are discharged into the reaction chamber downstream of the burner where they are mixed with at least one carbon dioxide-rich acid gas fraction from the regeneration unit.

For particularly carbon dioxide-rich feed gases the invention facilitates stable operation in the combustion zone on account of the enriched sulphur fraction, contrary to the prior-art method in which a common fraction is fed to the combustion stage of the Claus process. If, within the framework of the invention, pure oxygen is used as oxidant for the combustion of the high-sulphur fraction, stable operation will also be ensured in the acid gas combustion if the common acid gas fraction is constituted by a mixture which is no longer combustible.

The Claus reaction chamber is normally designed as a simple reaction chamber equipped with a refractory lining as the thermal Claus reaction takes place without any further accompanying substances at high temperatures of approx. 900° C. prevailing downstream of the burner. The rate of conversion to sulphur is approx. 40-60% with reference to the feed gas. According to prior art, the sulphur-containing gas leaving the Claus reaction chamber is fed to a Claus processing stage generally consisting of a cooling section, a condensation section for sulphur and subsequent Claus reactors in which non-converted sulphur dioxide ($SO_2$) is converted with hydrogen sulphide ($H_2S$).

In an embodiment of the invention the sulphur-containing gas leaving the reaction chamber is fed as Claus process gas to the next process steps of a catalytic Claus plant, in order to complete the incomplete reaction between hydrogen sulphide ($H_2S$) and sulphur dioxide ($SO_2$) in the Claus process gas.

In another embodiment of the invention a part-stream of the carbon dioxide-rich but sulphur constituents-depleted acid gas stream is discharged from the Claus plant. This part-stream of the carbon dioxide-rich but sulphur constituents-depleted acid gas stream can, for example, be discharged for any type of further processing.

In an embodiment of the invention the separation into at least two acid gas fractions is performed by first feeding the solvent laden with acid gases from gas scrubbing to a flash stage for the depletion of carbon dioxide prior to feeding the solvent to a regeneration column, thereby obtaining a carbon dioxide-rich acid gas fraction and a solvent laden with the residual acid gases, thereby obtaining in the regeneration column another carbon dioxide-depleted and sulphur constituents-enriched acid gas fraction which is fed to the Claus burner for combustion using an oxygen-containing gas.

The depletion in carbon dioxide of the laden solvent is preferably performed in two to four flash stages arranged in flow direction upstream of the regeneration column. The number of flash stages, however, can be optional. The process used for absorption, flashing in the flash stage and regeneration is arbitrary and is known in prior art. The amount of sulphur constituents in the sulphur constituents-enriched part-stream fed to the burner of the Claus reactor is typically 20 to 40 percent of the sulphur from the feed gas. In this way, it is feasible to operate the burner in a stable way and without the supply of additional combustion gas. Within the framework of the inventive method it should be possible to change this ratio if this is required to meet the requirements of the Claus process.

The Claus burner is operated with an oxygen-containing gas, for example, air. Depending on the design it is always possible to use oxygen-enriched air or pure oxygen as oxygen-containing gas in the Claus burner in order to compensate a temporarily or permanently low calorific value of the high-sulphur acid gas fraction. The combustion of the sulphur constituents from the acid gas gives the amount of sulphur dioxide ($SO_2$) required for the Claus process in the Claus burner. In another embodiment of the invention the air, the oxygen-enriched combustion air or the carbon dioxide-depleted, hydrogen sulphide-enriched acid gas is preheated by means of a heat exchanger prior to being fed to the burner. This serves to further reduce the content of sulphur constituents in the acid gas fraction to the Claus burner.

In this embodiment of the invention the high-sulphur acid gas fraction is completely combusted by means of a burner using air, oxygen-enriched air or pure oxygen, the Lambda value being one or approximately one. The Lambda value refers to the stoichiometric ratio of fuel to oxygen, a Lambda value of more than 1 signifying an excess of oxygen.

In an embodiment of the invention it is possible to branch off a part-stream permanently or temporarily from the high-sulphur acid gas and pass it to the gas mixing chamber of the Claus reactor for increasing the hydrogen sulphide portion. The amount of sulphur constituents fed to the Claus burner and completely converted with oxygen to sulphur dioxide is controlled via a bypass control system such that the amount of sulphur constituents fed to the Claus burner is approximately one third of the total sulphur amount of all acid gas fractions, the excess amount of sulphur constituents being fed to the Claus process gas in the process gas stream downstream of the Claus burner.

The high-sulphur acid gas fraction can also be mixed with a combustion gas in order to increase the calorific value of the acid gas fraction to the burner, thus further increasing the temperature in the Claus burner, if, for example, ammonia-containing vapours are included in the process. In this case, a combustion gas temperature of 1300° C. to 1400° C. is required to decompose the ammonia almost completely. Thus, it is ensured that no ammonium salt is formed in the subsequent Claus process. The combustion gas can be of any type. The combustion gas is preferably natural gas, synthesis gas and hydrogen. The combustion gas can also be mixed with a carbon dioxide-rich acid gas if this is required to ensure optimum process control.

The Claus burner as well can be supplied with a combustion gas. This combustion gas can be hydrocarbonaceous. To the combustion gas fed to the Claus burner an oxygen-containing gas, for example, is fed at an equal molar ratio and ensures exactly the complete combustion of the supplied combustion gas.

The industrial gas to be treated can also be of any type desired. In principle, it is possible to treat every gas containing carbon dioxide and sulphur constituents according to the invention. This especially applies to synthesis gases from an "acidic" CO conversion. Another example of a gas to be treated is natural gas or coke oven gas.

The solvent used for the absorption is preferably a physical solvent of a high selectivity for sulphur constituents, in particular hydrogen sulphide ($H_2S$), as compared to carbon dioxide ($CO_2$). Examples of suitable physical solvents are Morphysorb® (mixture of N-formylmorpholine and N-acetyl morpholine), Selexol® (mixture of dimethyl ethers of polyethylene glycols), N-methylpyrrolidone (NMP), methanol or propylene carbonate. However, a chemical solvent which is suitable for a selective removal of sulphur constituents as compared to carbon dioxide ($CO_2$) can also be used in aqueous solution. Examples of chemical solvents are methyl diethanol amine (MDEA), Flexsorb® (mixture of sterically hindered amines) or alkali salt solutions (e.g. potash solutions).

The carbon dioxide content of the industrial gas to be treated can be of any level desired. The carbon dioxide content in the feed gas can thus, for example, be 30 to 50 percent by volume. The application of the inventive method will be of particular advantage if the content of sulphur constituents is little compared to the carbon dioxide content. Thus it is possible to treat those gases the sulphur-constituents content of which ranges between 0.1 and 1 percent by volume hydrogen sulphide (or mole equivalent). The industrial gas to be treated can also contain ammonia. In this case, the ammonia is also fed to the Claus burner and converted to nitrogen and water on account of the set temperatures of 1300° C. to 1400° C., depending on the content of oxygen.

Normally, the pressure and the temperature in the absorption column of the gas scrubbing process range between 5 bar and 100 bar and 50° C. and 80° C. Normally, the pressure and the temperature for flashing in the flash stage range between 1 bar and 5 bar and 60° C. and 150° C. The Claus process can be influenced by changing these values. For example, an increase in temperature or reduction in pressure in the flash stage typically gives a higher portion of sulphur in the carbon dioxide-rich acid gas fraction. Ammonia-containing exhaust gases can also be fed to the carbon dioxide-rich stream or the Claus burner apart from the sulphur constituents-enriched acid gas fraction, the oxygen-containing gas and, if required, the combustion gas prior to being fed to the Claus reactor. These can be, for example, vapours or ammonia-containing exhaust gases from waste water flashing vessels.

The thermal Claus reactor as well can be of any type desired. Embodiments are known in prior art. The exhaust gas from the thermal Claus reactor is typically converted to sulphur in the subsequent catalytic Claus reactor stages according to prior art. The exhaust gas from the Claus plant can be further treated, disposed of or even partially returned to the inventive process. The Claus process gas leaving the reaction chamber can also be fed to a conventional Claus plant and to an additional downstream hydrogenation stage, thus obtaining hydrogenated Claus tail gas.

A part-stream of the carbon dioxide-rich but sulphur constituents-depleted acid gas stream can also be fed downstream of the complete Claus process to the hydrogenated Claus process gas, after the Claus process gas has been fed to a hydrogenation stage where all sulphur constituents of the Claus process gas are hydrogenated to form hydrogen sulphide ($H_2S$). In another embodiment the hydrogenated Claus process gas is fed to another selective gas scrubbing section. The residual hydrogen sulphide, except for traces, is then separated from the Claus tail gas obtained from the merged gas streams in this downstream gas scrubbing section.

The Claus tail gas leaving the gas scrubbing section is almost free of sulphur. In order to remove the residual traces of hydrogen sulphide, the desulphurised Claus tail gas can be fed to a post-combustion unit and the exhaust gas obtained discharged into the atmosphere.

Post-combustion typically takes place in a burner. The burner of the post-combustion unit can also be operated with an additional combustion gas and the exhaust gas obtained discharged into the atmosphere. In an embodiment of the invention the burner of the post-combustion unit is operated with an additional combustion gas.

In an embodiment of the invention the sulphur constituents-enriched acid gas obtained in the regeneration of the laden solvent from the additional selective gas scrubbing is fed to the burner of the Claus plant.

Another option is to feed the carbon dioxide-rich part-stream directly to a compressor for gas recycling, the said compressor recycling this part-stream together with the hydrogenated Claus tail gas to the main process gas stream upstream of the desulphurisation unit.

Claim is also laid to a contrivance with the aid of which the inventive method is carried out. Claim is particularly laid to a contrivance for the desulphurisation of hydrogen sulphide-containing and carbon dioxide-containing acid process gases, consisting of an absorption column,
a packed column designed as flash stage,
a regeneration column,
a Claus burner equipped with bypass control,
a Claus reaction chamber,
the absorption column, the flash stage, the regeneration column, the Claus burner and the Claus reaction chamber being arranged in series in flow direction, and the Claus burner being connected to the regeneration column in process flow, with the contrivance allowing the solvent to be fed from the flash stage to the regeneration column, and the regenerated solvent to be recycled to the absorption column, and the acid gas fraction to be fed from the flash stage to the Claus reaction chamber, and the acid gas fraction to be fed from the regeneration column to the Claus burner.

In a preferred embodiment the return line of the solvent from the regeneration column is equipped with a heat exchanger with the aid of which the cold solvent from the absorption column is preheated by the hot laden solvent from the regeneration column.

The Claus burner used for the combustion of the high-sulphur acid gas fraction can be of any type desired. In order to be able to set the Claus burner to the process parameters, the said burner is advantageously equipped with an additional feed nozzle for a combustion gas. The said nozzle can be rated for hydrocarbonaceous combustion gases. In order to run the Claus process, the burner is advantageously also equipped with a feed nozzle for an oxygen-enriched gas or for oxygen. The Claus burner is equipped with bypass control.

The Claus reaction chamber can also be of any type desired and, in the simplest case, is an empty, brick-lined chamber. Embodiments are adequately known in prior art. In order to be able to carry out the inventive method, the reaction chamber is provided with a nozzle for the supply of carbon dioxide-rich acid gas and a connection from the Claus burner to the reaction chamber. The reaction chamber can also be provided with feed nozzles for ammonia-containing gases or vapours.

The other contrivance components, such as absorption columns, flash stages and regeneration columns, can also be of any type desired and are known in prior art. The inventive contrivance also includes valves, pumps, compressors, heating and cooling devices, heat exchangers and all contrivance-specific components required for operation of the plant described. These can be arranged at any point in the process flow. This, of course, also includes the necessary control devices.

The inventive method has the advantage to facilitate a complete and simple desulphurisation of carbon dioxide-rich acid gases. Even at small amounts of sulphur constituents in the acid gas, the combustion of the $H_2S$-rich acid gas fraction can reach the required minimum combustion temperature for the Claus process, whereas this minimum temperature would not be achieved with the Claus process using one acid gas fraction only.

The inventive device is illustrated in more detail by means of three drawings, the said drawings only being examples for the design of the inventive contrivance.

Figure 1:
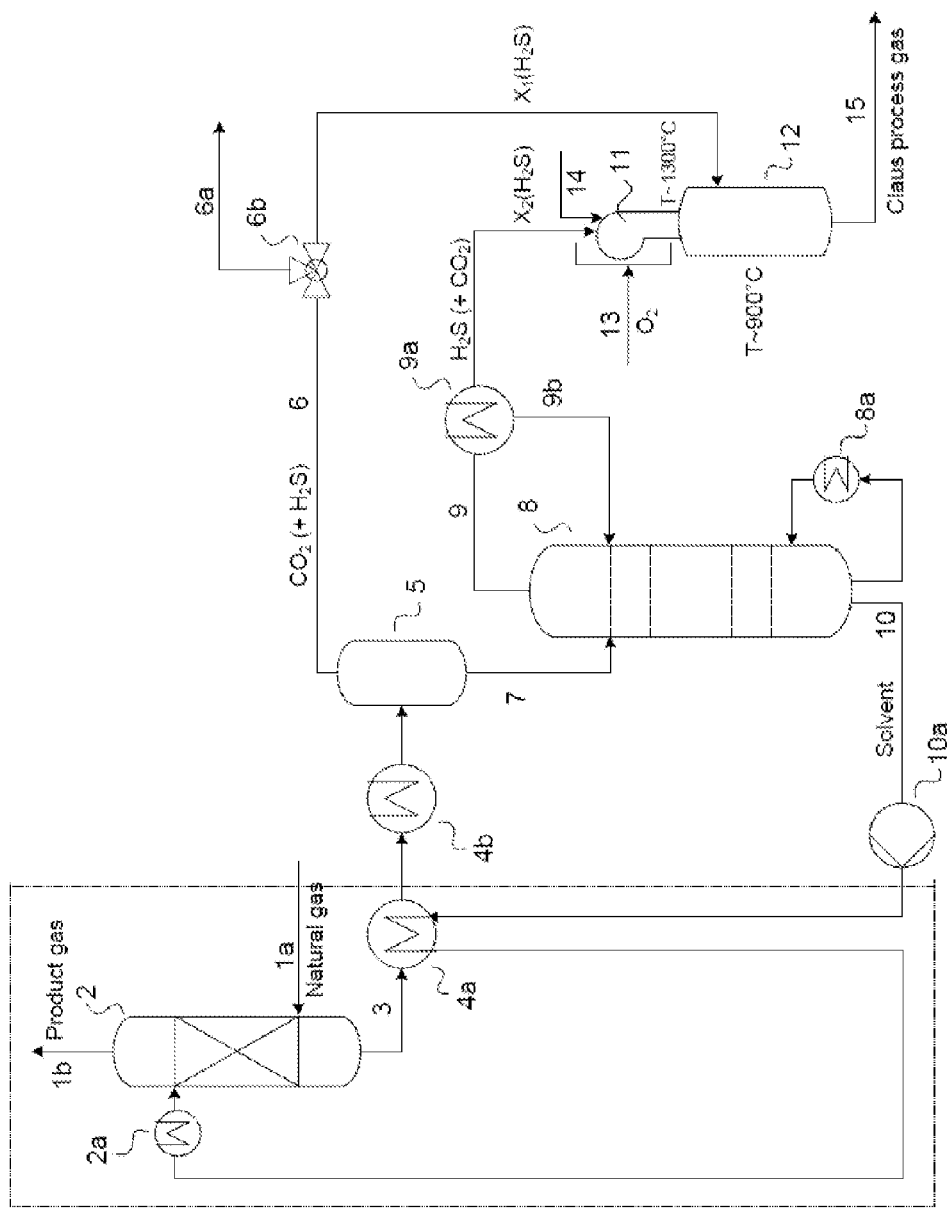
FIG. 1 shows an inventive embodiment in which a Claus process gas for downstream processing is obtained without any further intermediate steps.

FIG. 1 shows an inventive process flow. An industrial sulphur-containing gas to be treated (1a), e.g. natural gas, is passed through an absorption column (2) where it is brought into contact with an absorbing solvent cooled down by means of a heat exchanger (2a). This gives a treated product gas (1b) which is free or almost free of sulphur compounds, the major part of the carbon dioxide contained in the feed gas (1a) also remaining in the product gas (1b), and the solvent laden with acid gases (3). According to the invention the laden solvent is preheated by means of heat exchangers (4a,4b) and passed to a flash vessel (5). Flashing in the flash vessel (5) gives a carbon dioxide-laden, hydrogen sulphide-depleted acid gas fraction (6) poor in sulphur compounds and a carbon dioxide-depleted, sulphur constituents-enriched laden solvent (7). This is passed to a regeneration column (8) which is here, in an exemplary mode, heated by means of a reboiler (8a), the solvent being freed from the sulphur constituents-enriched acid gas by heating and flashing. This gives a carbon dioxide-depleted, sulphur constituents-enriched acid gas (9) and a regenerated solvent (10). The acid gas (9) is fed to the Claus burner (11) via a condenser (9a). Flash steam condensate (9b) is recycled to the regeneration column (8). The carbon dioxide-laden, hydrogen sulphide-depleted acid gas fraction (6) from the flash vessel (5) has a lower sulphur constituents concentration ($X_1(H_2S)$) than the acid gas fraction richer in sulphur constituents (9) from the regeneration column (8) ($X_2$, ($H_2S$)). The regenerated solvent freed from acid gas constituents (10) is recycled by means of a pump (10a) to the absorption column (2) via a heat exchanger (4a).

According to the invention the carbon dioxide-depleted, sulphur constituents-enriched acid gas (9) is used for the operation of the Claus burner (11) and the carbon dioxide-laden, hydrogen sulphide-depleted acid gas fraction (6) is fed to the Claus reaction chamber (12) of the thermal reaction stage. The Claus burner (11) is operated with oxygen or an oxygen-containing gas (13). In a typical embodiment the temperature in the Claus burner (11) is 1300° C. and a mixing temperature of approx. 900° C. is reached in the Claus reaction chamber (12) after mixing of the hot exhaust gases from the Claus burner (11) with the carbon dioxide-laden, hydrogen sulphide-depleted acid gas fraction (6). Ammonia-containing vapours (14) can be fed to the carbon dioxide-depleted, hydrogen sulphide-rich acid gas (9) in the Claus burner (11). The product leaving the Claus reaction chamber (12) is a Claus process gas (15). A part-stream (6a) of the carbon dioxide-laden, hydrogen sulphide-depleted acid gas (6) can be discharged from the plant via a valve (6b) if required and passed to further process steps.

Figure 2:
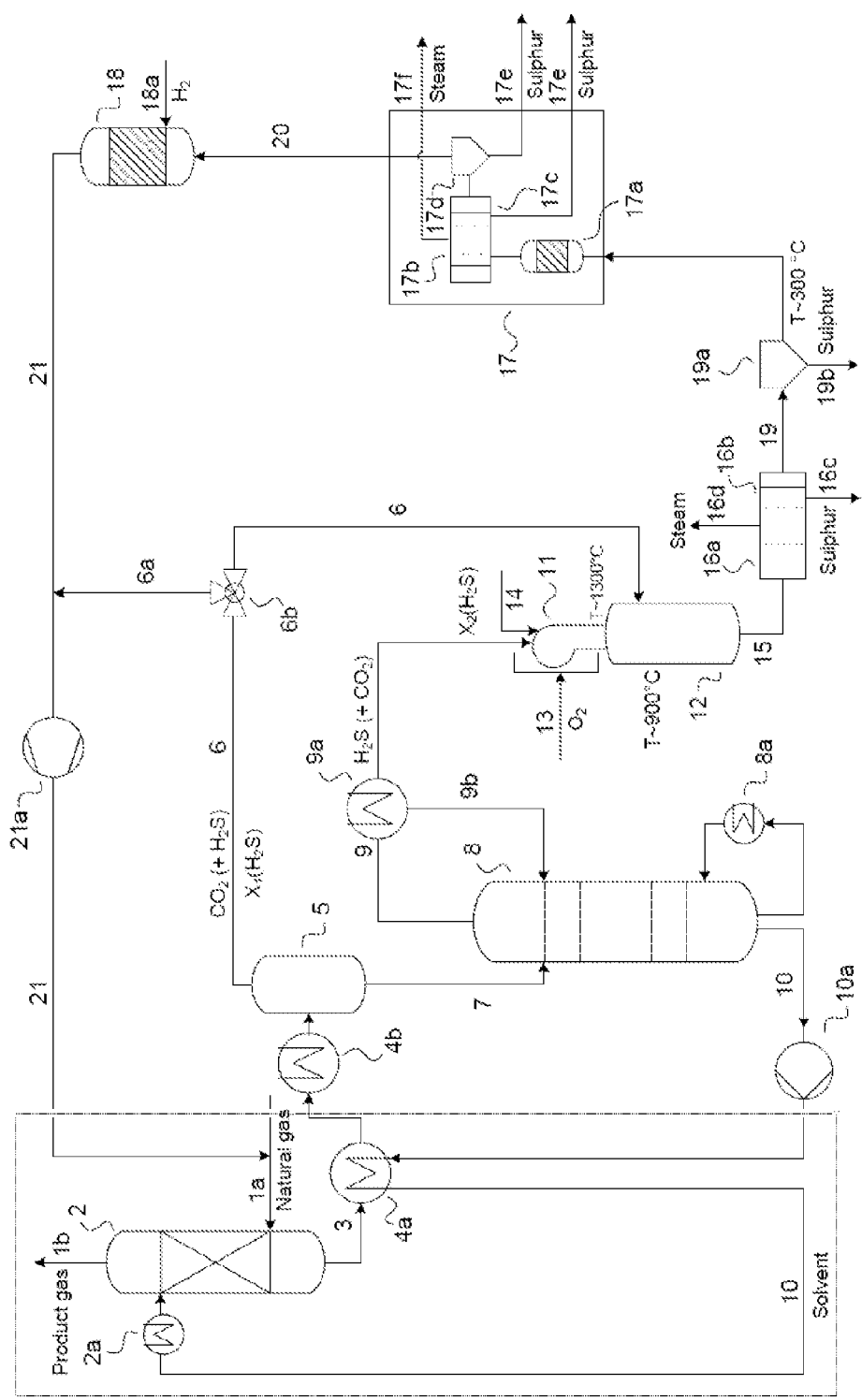
FIG. 2 shows an inventive embodiment in which the Claus process gas leaving the thermal reaction stage is fed to a conventional catalytic Claus stage, a hydrogenation stage and a recycling system.

FIG. 2 shows the same process as FIG. 1, including a subsequent sulphur recovery stage (16), a subsequent conventional Claus reaction section (17) and a hydrogenation stage (18). According to the invention the carbon dioxide-depleted, sulphur constituents-enriched acid gas (9) is used for the operation of the Claus burner (11) and the carbon dioxide-laden, hydrogen sulphide-depleted acid gas (6) depleted in sulphur constituents is fed to the Claus reaction chamber (12). Then, the Claus process gas (15) is discharged from the Claus reaction chamber (12). From there, it is fed to a sulphur recovery stage (16) consisting of a cooling section (16a) and a sulphur condensation section (16b). As a result, liquid sulphur (16c) is obtained. By the cooling process vapour is produced (16d). The partially desulphurised Claus process gas (19) is freed from sulphur droplets (19b) by means of a downstream sulphur separator (19a). The partially desulphurised Claus process gas (19) obtained from the sulphur recovery stage (16) is fed to a downstream catalytic Claus reaction stage (17). There, the partially desulphurised Claus process gas (19) is further converted to sulphur (17e) in a downstream conventional Claus reaction stage (17) which typically consists of a catalytic Claus reactor (17a) which continues to convert residual hydrogen sulphide with sulphur dioxide to sulphur, a further sulphur condensation section (17c) and a sulphur separator (17d), with liquid sulphur (17e) and vapour (17f) being obtained. By this subsequent conversion, conversion rates in the total Claus reaction of approx. 96% (referred to the feed gas (1a)) are achieved in, for example, a two-stage catalytic Claus reaction stage (17). The Claus tail gas (20) is then fed to a hydrogenation stage (18) equipped with the respectively required gas preheaters. The hydrogenated Claus tail gas (21) thus obtained contains sulphur only in the form of hydrogen sulphide ($H_2S$). The hydrogenated Claus tail gas (21) is mixed, if required, with a part-stream of the carbon dioxide-laden, hydrogen sulphide-depleted acid gas (6a) via a valve (6b) and recycled to the feed gas (1a) in the main process gas stream by means of a recycle compressor (21a).

Figure 3:
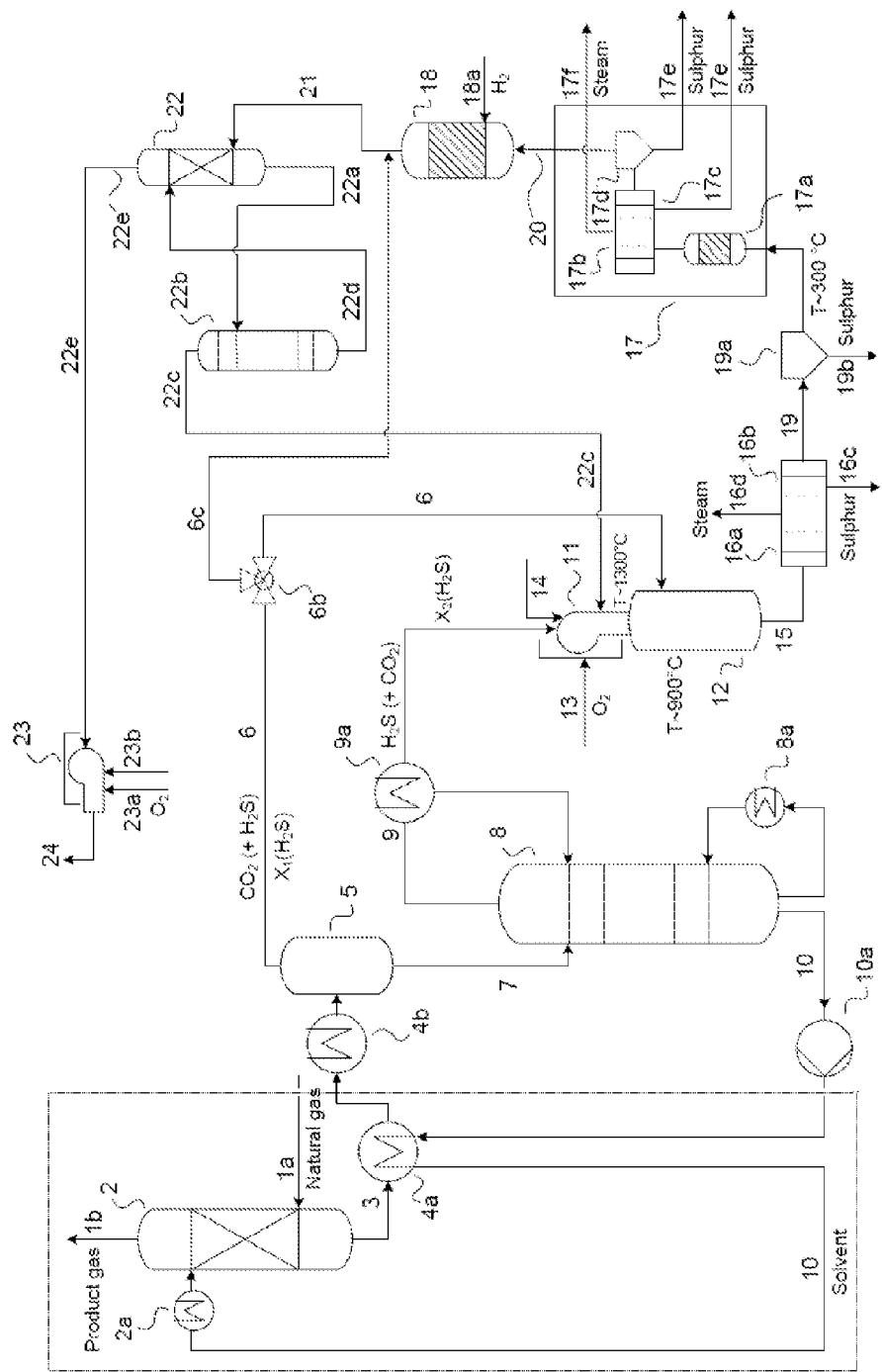
FIG. 3 shows an embodiment in which the Claus process gas obtained leaves the reaction chamber and is passed through a conventional Claus stage, a hydrogenation and a gas scrubbing stage.

FIG. 3 shows the same process as FIG. 1, including a subsequent sulphur recovery stage (16), a subsequent conventional Claus reaction stage (17) and a hydrogenation stage (18). According to the invention the carbon dioxide-depleted, sulphur constituents-enriched acid gas (9) is used for the operation of the Claus burner (11) and the carbon dioxide-laden, hydrogen sulphide-depleted acid gas (6) depleted in sulphur constituents is fed to the Claus reaction chamber (12).

Then, the Claus process gas (15) is discharged from the Claus reaction chamber (12). From there, it is fed to a sulphur recovery stage (16) consisting of a cooling section (16a) and a sulphur condensation section (16b). As a result, liquid sulphur (16c) is obtained. By the cooling process vapour is produced (16d). The partially desulphurised Claus process gas (19) is freed from sulphur droplets by means of a downstream sulphur separator (19a). The process gas (19) obtained from the sulphur recovery stage (16) is then fed to a downstream Claus reaction stage (17). There, the partially desulphurised Claus process gas (19) is further converted to sulphur (17e) in a downstream conventional Claus reaction section (17) which typically consists of a catalytic Claus reactor (17a) which continues to convert residual hydrogen sulphide with sulphur dioxide to sulphur, a further sulphur condensation section (17c) and a sulphur separator (17d), with liquid sulphur (17e) and steam (17f) being obtained. By this subsequent conversion, conversion rates in the total Claus reaction of approx. 96% (referred to the feed gas (1a)) are achieved in, for example, a two-stage catalytic reaction stage (17).

The Claus tail gas (20) thus obtained is then fed to a hydrogenation stage (18) where all sulphur constituents are hydrogenated to hydrogen sulphide ($H_2S$). The hydrogenated Claus tail gas (21) is then fed to a selective gas scrubbing section (22). The residual hydrogen sulphide ($H_2S$) contained in the hydrogenated Claus tail gas is almost completely removed by scrubbing in a downstream gas scrubbing stage via an absorption column (22) and recovered from the laden solvent (22a) in a related regeneration column (22b) as acid gas fraction (22c). This acid gas fraction (22c) is fed to the burner (11) of the thermal reaction stage of the Claus plant as additional acid gas fraction and burnt to give sulphur dioxide ($SO_2$). The regenerated solvent (22d) is circulated in a loop. A part-stream (6c) of the carbon dioxide-laden, hydrogen sulphide-depleted acid gas can also be fed to upstream of the absorption column (22). This process gas stream together with the Claus tail gas (21) is freed from hydrogen sulphide ($H_2S$) in the selective gas scrubbing section (22) and the desulphurised Claus tail gas (22e) obtained fed to a post-combustion unit (23). There it is burnt with an oxygen-containing gas (23a) with the addition of a combustion gas (23b) if required. The exhaust gas (24) contains only little amounts of sulphur dioxide ($SO_2$) and can be discharged into the atmosphere.

LIST OF REFERENCE NUMBERS AND DESIGNATIONS

1a Industrial sulphur-containing gas to be treated, natural gas
1b Treated product gas
2 Absorption column
2a Heat exchangers
3 Laden solvent
4a,4b Heat exchanger
5 Flash vessel
6 Carbon dioxide-laden, hydrogen sulphide-depleted acid gas
6a Part-stream of the carbon dioxide-laden, hydrogen sulphide-depleted acid gas
6b Valve
7 Carbon dioxide-depleted, sulphur constituents-enriched laden solvent
8 Regeneration column
8a Reboiler
9 Carbon dioxide-depleted, sulphur constituents-enriched acid gas
9a Condenser
9b Recycled part-stream
10 Regenerated solvent
10a Pump
11 Claus burner/combustion chamber
12 Claus reaction chamber
13 Oxygen or oxygen-containing gas
14 Ammonia-containing vapours
15 Hot Claus process gas
16 Sulphur recovery stage
16a Cooling section
16b Sulphur condensation section
16c Sulphur
16d Vapour
17 Conventional Claus reaction stage
17a Catalytic Claus reactor
17b Cooling section
17c Condensation section
17d Sulphur separator
17e Sulphur
17f Vapour
18 Hydrogenation stage
18a Hydrogen
19 Desulphurised Claus process gas
19a Sulphur separator
19b Sulphur
20 Claus tail gas
21 Hydrogenated Claus tail gas
21a Recycle compressor
22 Absorption column of the gas scrubbing section
22a Laden solvent
22b Regeneration column
22c Acid gas fraction
22d Regenerated solvent
22e Desulphurised Claus tail gas
23 Post-combustion unit
23a Oxygen-containing gas
23b Combustion gas
24 Exhaust gas
$X_1(H_2S)$ Concentration of $H_2S$ in the carbon dioxide-rich acid gas
$X_2(H_2S)$ Concentration of $H_2S$ in the $H_2S$-enriched acid gas fraction

The invention claimed is:

1. A method for the processing of a carbon dioxide-rich acid gas in a Claus process,
    (a) an industrial gas to be freed from sulphur constituents and containing at least hydrogen sulphide and carbon dioxide as acid gas constituents is submitted to a first gas scrubbing using an acid gas-absorbing solvent which absorbs sulphur constituents more selectively than carbon dioxide, and
    (b) the laden solvent is fed to a regeneration unit for regeneration, and
    (c) the acid gas liberated in the regeneration and consisting of sulphur constituents and carbon dioxide ($CO_2$) is separated into at least two acid gas fractions, and at least one acid gas fraction of a higher content of sulphur constituents is obtained, and
    (d) the fraction of the highest content of sulphur constituents from step (c) is fed to the upstream Claus burner of the thermal reaction section of a Claus reactor, and the sulphur constituents contained being converted at least partially to form a sulphur dioxide ($SO_2$)-containing gas by the aid of an oxygen-containing gas, and
    (e) the hot combustion gases are discharged into the reaction chamber downstream of the burner where they are mixed with at least one carbon dioxide-rich acid gas fraction from the regeneration unit.

2. The method for the processing of a carbon dioxide-laden acid gas in a Claus process according to claim 1, wherein the Claus process gas leaving the reaction chamber is fed to a catalytic Claus plant in a further process step.

3. The method for the processing of a carbon dioxide-rich acid gas in a Claus process according to claim 1, wherein a part-stream of the carbon dioxide-rich but sulphur constituents-depleted acid gas stream is discharged for any type of further processing.

4. The method for the processing of a carbon dioxide-rich acid gas in a Claus process according to claim 1, wherein the separation into at least two acid gas fractions is performed by first feeding the solvent laden with acid gases from gas scrubbing to a flash stage for the depletion of carbon dioxide prior to feeding the solvent to a regeneration column, thereby obtaining a carbon dioxide-rich acid gas fraction and a solvent laden with the residual acid gases, thereby obtaining in the regeneration column another carbon dioxide-depleted and sulphur constituents-enriched acid gas fraction fed to the Claus burner for combustion using an oxygen-containing gas.

5. The method for the processing of a carbon dioxide-rich acid gas in a Claus process according to claim 1, wherein the depletion in carbon dioxide of the laden solvent is performed in two to four flash stages arranged in flow direction upstream of the regeneration column.

6. The method for the processing of a carbon dioxide-rich acid gas in a Claus process according to claim 1, wherein the amount of sulphur constituents in the sulphur constituents-enriched part-stream fed to the burner of the Claus reactor is 20 to 40 percent of the total sulphur from the feed gas.

7. The method for the processing of a carbon dioxide-rich acid gas in a Claus process according to claim 1, wherein the oxygen-containing gas used for operating the Claus burner is air.

8. The method for the processing of a carbon dioxide-rich acid gas in a Claus process according to claim 1, wherein the oxygen-containing gas used for operating the Claus burner is oxygen-enriched air.

9. The method for the processing of a carbon dioxide-rich acid gas in a Claus process according to claim 1, wherein the oxygen-containing gas used for operating the Claus burner is pure oxygen.

10. The method for the processing of a carbon dioxide-rich acid gas in a Claus process according to claim 1, wherein the carbon dioxide-depleted, hydrogen sulphide-enriched acid gas used for operating the Claus burner is preheated by means of a heat exchanger prior to being fed to the burner.

11. The method for the processing of a carbon dioxide-rich acid gas in a Claus process according to claim 1, wherein a combustion gas is mixed to the carbon dioxide-depleted, sulphur constituents-enriched acid gas.

12. The method for the processing of a carbon dioxide-rich acid gas in a Claus process according to claim 1, wherein a combustion gas is fed to the Claus burner.

13. The method for the processing of a carbon dioxide-rich acid gas in a Claus process according to claim 11, wherein the hydrocarbonaceous combustion gas is natural gas or synthesis gas.

14. The method for the processing of a carbon dioxide-rich acid gas in a Claus process according to claim 11, wherein the combustion gas fed to the Claus burner an oxygen-containing gas is fed at an equal molar ratio and ensures exactly the complete combustion of the supplied combustion gas.

15. The method for the processing of a carbon dioxide-rich acid gas in a Claus process according to claim 1, wherein ammonia-containing exhaust gases are also fed to the Claus burner apart from the sulphur constituents-enriched acid gas fraction, the oxygen-containing gas and, if required, the combustion gas.

16. The method for the processing of a carbon dioxide-rich acid gas in a Claus process according to claim 1, wherein a selectively acting chemical scrubbing agent is used for acid gas scrubbing.

17. The method for the processing of a carbon dioxide-rich acid gas in a Claus process according to claim 1, wherein a physical scrubbing agent is used for acid gas scrubbing.

18. The method for the processing of a carbon dioxide-rich acid gas in a Claus process according to claim 1, wherein the industrial gas to be treated for desulphurisation is synthesis gas from a CO conversion.

19. The method for the processing of a carbon dioxide-rich acid gas in a Claus process according to claim 1, wherein the industrial gas to be treated for desulphurisation is a natural gas.

20. The method for the processing of a carbon dioxide-rich acid gas in a Claus process according to claim 1, wherein a part-stream of the carbon dioxide-rich but sulphur constituents-depleted acid gas stream is recycled by means of a compressor for gas recycling to the main process gas stream upstream of the desulphurisation unit.

21. The method for the processing of a carbon dioxide-rich acid gas in a Claus process according to claim 1, wherein the Claus process gas leaving the reaction chamber is fed to a conventional Claus reaction stage and an additional downstream hydrogenation stage, thus obtaining a hydrogenated Claus tail gas.

22. The method for the processing of a carbon dioxide-rich acid gas in a Claus process according to claim 21, wherein a part-stream of the carbon dioxide-rich but sulphur constituents-depleted acid gas stream is fed to the hydrogenated Claus tail gas.

23. The method for the processing of a carbon dioxide-rich acid gas in a Claus process according to claim 21, wherein the hydrogenated Claus tail gas is fed to another selective gas scrubbing section.

24. The method for the processing of a carbon dioxide-rich acid gas in a Claus process according to claim 23, wherein the desulphurised Claus tail gas is fed to a post-combustion unit and the exhaust gas obtained discharged into the atmosphere.

25. The method for the processing of a carbon dioxide-rich acid gas in a Claus process according to claim 24, wherein the burner of the post-combustion unit is operated with an additional combustion gas.

26. An apparatus for the processing of a carbon dioxide-rich acid gas in a Claus process, consisting of
    an absorption column,
    a packed column designed as flash stage,
    a regeneration column,
    a Claus burner equipped with bypass control,
    a Claus reaction chamber,
    the absorption column, the flash stage, the regeneration column, the Claus burner and the Claus reaction chamber being arranged in series in flow direction, and the Claus burner being connected to the regeneration column in process flow, with the apparatus allowing the solvent to be fed from the flash stage to the regeneration column, and the regenerated solvent to be recycled to the absorption column, and the acid gas fraction to be fed from the flash stage to the Claus reaction chamber, and the acid gas fraction to be fed from the regeneration column to the Claus burner.

27. The apparatus for the processing of a carbon dioxide-rich acid gas in a Claus process according to claim 26, wherein the Claus reaction chamber is equipped with an additional feed nozzle for a carbon dioxide-enriched acid gas.

28. The apparatus for the processing of a carbon dioxide-rich acid gas in a Claus process according to claim 26, wherein the Claus burner is equipped with an additional feed nozzle for a combustion gas.

29. The apparatus for the processing of a carbon dioxide-rich acid gas in a Claus process according to claim 26, wherein the Claus burner is equipped with an additional feed nozzle for ammonia-containing vapours, the disclosures of which are incorporated in their entirety by reference herein.

* * * * *